(12) United States Patent
Hu et al.

(10) Patent No.: US 9,934,255 B2
(45) Date of Patent: *Apr. 3, 2018

(54) END OF RETENTION PROCESSING USING A DATABASE MANAGER SCHEDULER

(71) Applicant: International Business Machines Corporation, Armonk, NY (US)

(72) Inventors: Tawei Hu, San Jose, CA (US); Iun V. Leong, Union City, CA (US); Yongliang Li, Beijing (CN); Phong K. Truong, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 592 days.

This patent is subject to a terminal disclaimer.

(21) Appl. No.: 14/076,312

(22) Filed: Nov. 11, 2013

(65) Prior Publication Data
US 2015/0134627 A1    May 14, 2015

(51) Int. Cl.
*G06F 17/30* (2006.01)
(52) U.S. Cl.
CPC ............... *G06F 17/30289* (2013.01)
(58) Field of Classification Search
None
See application file for complete search history.

(56) References Cited

U.S. PATENT DOCUMENTS

| 7,818,300 B1 * | 10/2010 | Kilday | G06Q 10/10 |
| | | | 707/662 |
| 2007/0233709 A1 * | 10/2007 | Abnous | G06F 17/30607 |
| 2007/0294308 A1 * | 12/2007 | Megerian | G06F 17/30289 |
| 2008/0270455 A1 * | 10/2008 | Bendel | G06F 17/30289 |
| 2010/0106691 A1 * | 4/2010 | Preslan | G06F 11/1453 |
| | | | 707/674 |
| 2011/0029572 A1 | 2/2011 | Sato | |
| 2013/0263289 A1 * | 10/2013 | Vijayan | G06F 21/60 |
| | | | 726/31 |
| 2015/0134628 A1 | 5/2015 | Hu et al. | |

FOREIGN PATENT DOCUMENTS

WO    0135256 A2    5/2001

OTHER PUBLICATIONS

Zhu et al., "Creating Value-Based Archiving Solutions with IBM Content Collector"., ibm.com/redbooks, Jan. 2013, Sg24-8078-00, pp. 1-312.
Mortimer et al., "Using ADSM to Back Up Databases"., http://www.redbooks.ibm.com, Jul. 1998, Sg24-4335-03, pp. 1-618.

* cited by examiner

*Primary Examiner* — Syling Yen
*Assistant Examiner* — Soheila (Gina) Davanlou
(74) *Attorney, Agent, or Firm* — L. Jeffrey Kelly

(57) ABSTRACT

End of retention processing is provided. Included is: creating, using a content manager (CM), an end of retention policy for a content in a database management system (DBMS; and creating, based on the end of retention policy, a stored procedure in the DBMS for managing the end of retention policy.

10 Claims, 5 Drawing Sheets

END OF RETENTION PROCESSING USING A DATABASE MANAGER SCHEDULER

FIELD

The present disclosure relates generally to the field of computer systems, and more particularly, to end of retention processing in a content management system.

BACKGROUND

A document's lifecycle covers the period from the document's creation through to its destruction. During its lifecycle, a document is subject to changing requirements for capture, storage, index, access, and timely retrieval and deletion. Typically, organizations retain documents for a minimum period of time (i.e., retention period) prior to the destruction of the documents which may depend upon several factors. For example, documents related to litigation may be assigned a retention period that complies with various laws and regulations. Business records may have a retention period based on one or more business rules. A default category having a short retention period may be defined for non-essential business documents. When documents are no longer needed, an effective retention policy ensures timely and cost-effective removal from the repository. In practice, at the expiration of the retention period, an administrator of a document management system may create one or more programs to search the document repository databases for expired documents and delete them. These programs may then be scheduled to run using the native scheduler provided with the operating system. However, this approach may introduce operational challenges and inaccuracies, such as incorrectly removing or retaining documents, or monitoring and recovering a program that failed during an off-hours execution.

BRIEF SUMMARY

Among other things, a computer-implemented method is provided that according to an embodiment may include creating, using a content manager (CM), an end of retention policy for a content in a database management system (DBMS); and creating, based on the end of retention policy, a stored procedure in the DBMS for managing the end of retention policy.

In another embodiment a computer-implemented program product may be provided. The computer-implemented program product may comprise: a computer readable storage medium readable by a processing circuit and storing instructions for execution by the processing circuit for performing a method comprising: creating, in a content manager (CM), an end of retention policy for a content in a database management system (DBMS); and creating, and based on the end of retention policy, a stored procedure in the DBMS.

In another embodiment a computer system may be provided. The computer system may include one or more processors, one or more computer-readable storage devices, and a plurality of program instructions stored on at least one of the one or more storage devices for execution by at least one of the one or more processors. The plurality of program instructions may include program instructions for creating, using a content manager (CM), an end of retention policy for a content in a database management system (DBMS); and creating, based on the end of retention policy, a stored procedure in the DBMS.

BRIEF DESCRIPTION OF THE SEVERAL VIEWS OF THE DRAWING

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
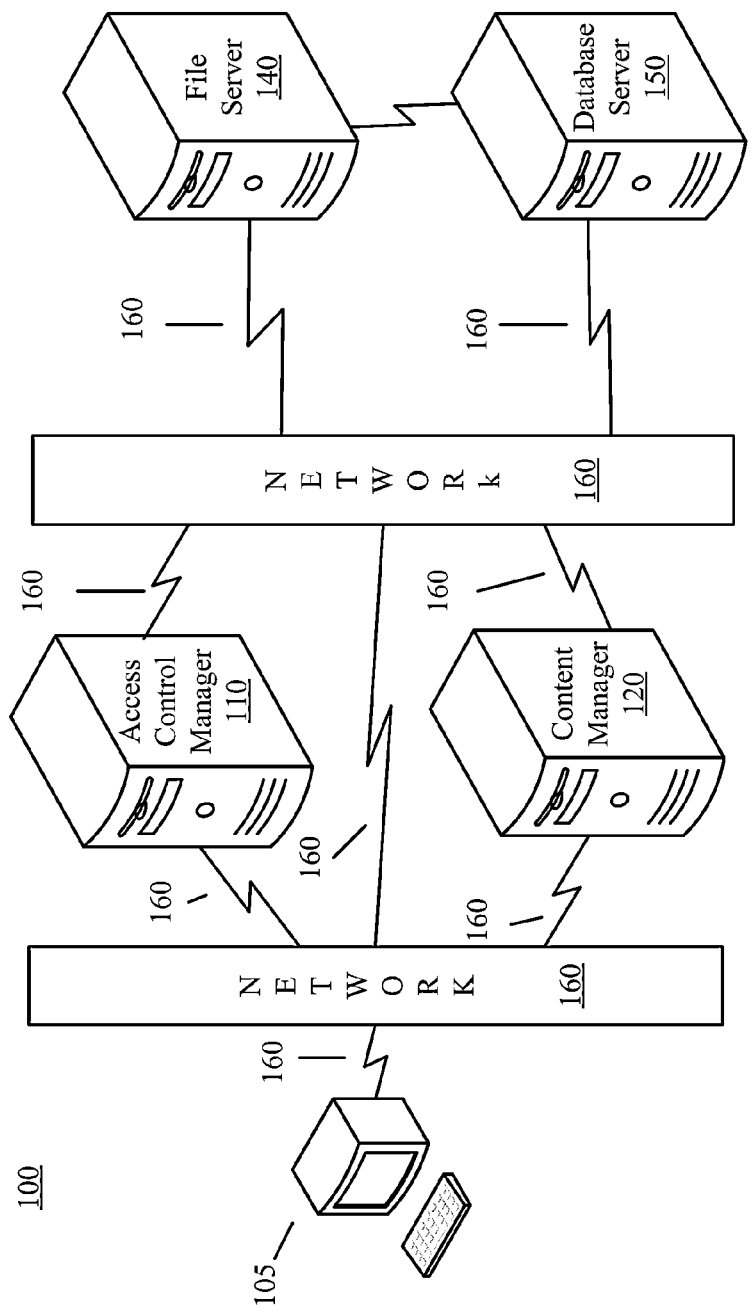
FIG. 1 is a block diagram illustrating an exemplary embodiment of a system for performing end of retention processing using a database manager scheduler.
Figure 2:
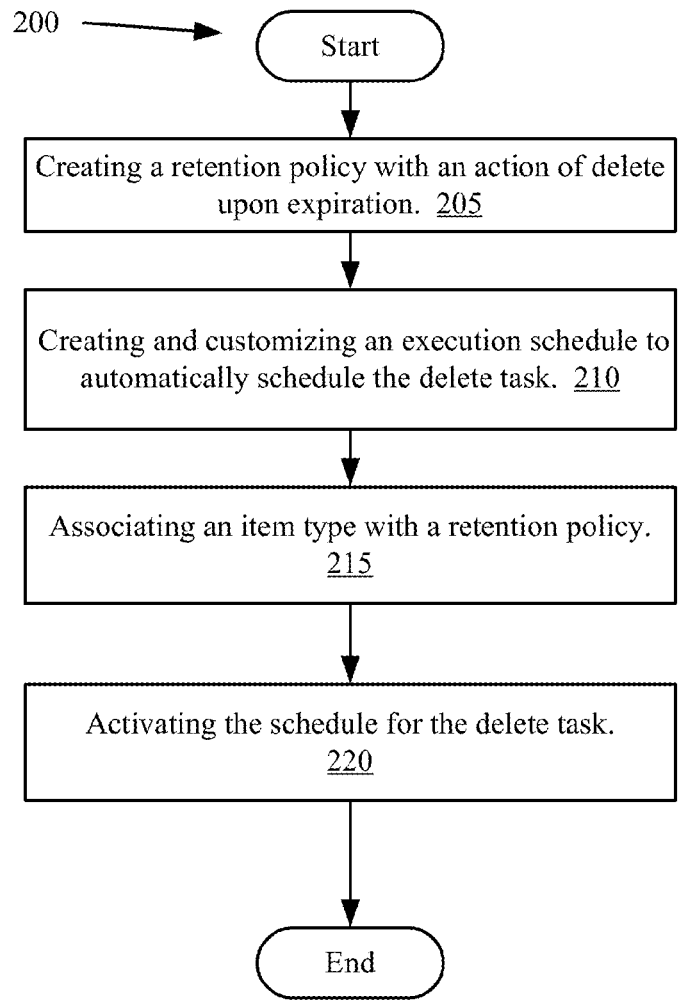
FIG. 2 is a flow diagram illustrating an overview of an exemplary embodiment of a method for performing end of retention processing using a database manager scheduler.

Embodiments of the present invention will now be described with reference to the figures. Referring to FIGS. 1-2, a Content Management (CM) system 100 and method 200 provide an exemplary implementation for end of retention processing using a database manager scheduler.

FIG. 1 is a block diagram of an exemplary embodiment of a CM system 100 suitable for implementing and managing an end of retention policy using a database manager scheduler. The CM system 100 includes a content manager 120, and one or more data storage areas, such as a fileserver 140 and a database server 150, which are connected over one or more networks 160 to each other and to one or more end-user clients 105. The CM system 100 may include an access control manager 110, which provides authorization in response to requests to access content under the management of the CM. The CM system 100 may include additional servers, end-user clients, and other devices not shown, and individual components of the system may occur either singly or in multiples, such as multiple data storage areas.

The content manager 120 may include one or more program modules configured for generally managing the life cycle of content in the CM system 100, such as for example creating, modifying, archiving, versioning, and publishing the content. The CM system 100 may additionally manage a policy, referred to as a retention policy, for maintaining the documents of an organization from the time the documents are created up to their eventual disposal. The retention policy may include, for example, the classifying, storing, securing, and archiving or eventual destruction of the documents. In the context of a CM system 100, a document may also be referred to as a record, or more generally as content. A record may be a tangible object, such as a paper birth certificate, a digital form, such as an email, or a digital representation of a tangible object, such as the birth certificate once scanned into a digital file. As a record reflects the activities of a business or organization, a record may further include other formats, such as, video, audio, and photos.

The CM system 100 may provide metadata to categorize and describe the characteristics of each type of content being managed, including for example an author, a content creation date, a business function associated with the content, and a content type. The content manager 120 may use the metadata associated with the content to organize and manage the content. The content manager 120 may use metadata when evaluating authorizing requests for content from end-users or from other components in the CM system 100. Additionally, the CM system 100 may reference the metadata to assist, when applying the retention policy, in locating the content, which may reside on or more database servers 150 or fileservers 140. Other functions that the content manager 120 may provide include managing a centralized repository that contains the system configuration and stored procedures, managing the metadata associated with the content, managing the data storage areas, such as a fileserver 140 and a database server 150, and responding to requests from the access control manager 110. The content manager 120 may organize its content and metadata using a highly typed extensible object-oriented data model, provided through properties, classes, objects, inheritance, etc.

An access control manager 110 may include one or more program modules configured to enable end-users to access and manage content stored in the CM system 100 in a flexible manner. For example by implementing an authorization model, such as Role Based Access Control, an end-user's access rights may be defined with granularity to control which actions may be performed on one or more given objects according to the end-user's role.

The end-user client 105 may be included as an interface through which an end-user may access the services provided by CM system 100, such as for managing and viewing content, and creating and managing retention policies, among other activities. In one exemplary embodiment, the end-user client 105 may be provided as a web-based User Interface (UI), including a Graphical UI (GUI). In another embodiment, the end-user client 105 may also provide a command line option for creating and managing retention policies. Alternatively, the end-user client 105 may be embodied as a stand-alone workstation in a client-server model where applications or tools are distributed from a central server in the CM system 100 to execute locally on the workstation. One or more of the components in the CM system 100 may further provide an Application Program Interface (API) through which the CM system 100 may be customized according to a business enterprise's requirements. In an embodiment, for example, the content manager 120 or may provide an API through which the CM system administrator may create and manage retention policies in a program language, such as for example, Java, Structured Query Language (SQL), C and C++, among others.

The end-user client 105 may also be configured as an administrative workstation through which the CM system administrator may implement and manage retention policies, as well as apply the retention policies to the content.

The content manager 120, the access control manager 110, and the end-user client 105 may each be implemented in the form of separate processing systems, or may be in the form of software modules. A processing system may be implemented by one or more of any conventional or other computer or processing systems equipped such as that illustrated in FIG. 5. The content manager 120, access control manager 110, and end-user client 105 may be co-located, or may be linked together to communicate over one or more networks, such as a network 160. If embodied in software, the functions embodied by the content manager 120, end-user client 105, and access control manager 110 may be expressed as one or more specialized program modules residing within a computer environment such as that shown in FIG. 5.

Data storage areas, such as the fileserver 140 and the database server 150 may be local to the content manager 120 or remote from, and in communication with, the content manager 120 via one or more networks 160. The data storage areas may be implemented by any quantity of any type of conventional or other databases (e.g., network, hierarchical, relational, object, etc.) or storage structures (e.g., files, data structures, disk or other storage, etc.) suitable for storing and retrieving various forms of content, such as a photo, an e-mail, a sound recording, and a text document. The database server 150 may store the retention policy, in one or more specialized tables within a catalog in the database. The retention policy as stored in the database server 150 may be implemented as a stored procedure.

The particular description in FIG. 1 is for illustrative purposes only; it should be understood that the invention is not limited to specific described embodiments, and any combination is contemplated to implement and practice the invention.

Figure 3:
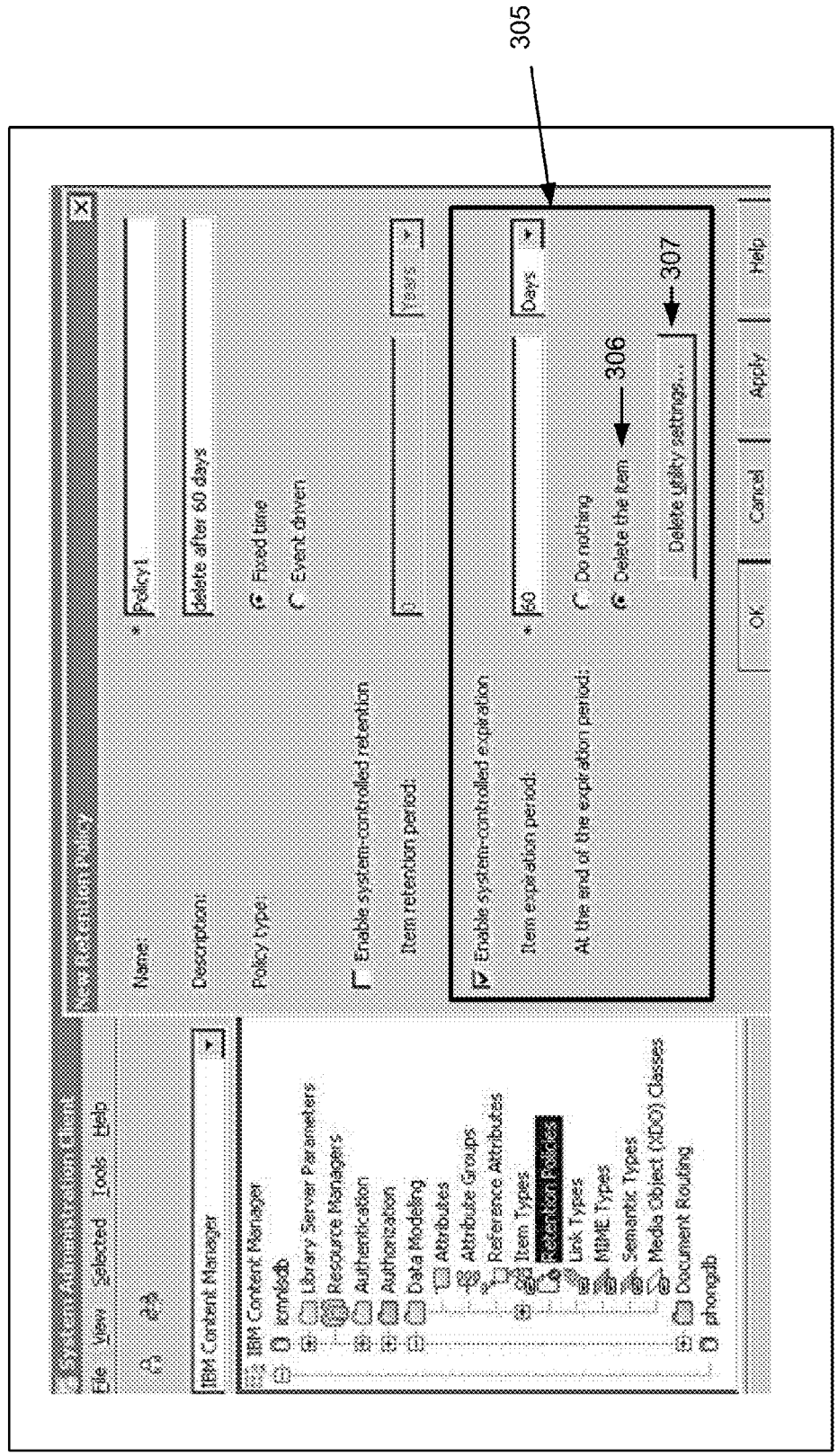
FIG. 3 is a screen depicting fields comprising an exemplary retention policy.

Referring now to FIG. 2, the reference numeral 200 generally designates a flow diagram of an exemplary embodiment of a method for processing end of retention using a database manager scheduler. At 205, a CM administrator may create a retention policy with an action of delete upon expiration. Using an end-user client workstation 105 configured as the CM administration workstation, the CM administrator may access a repository of stored procedures that automate the processing of the enterprise's various retention policies. Alternatively, the CM administrator may create a new retention policy, which may be embodied as a stored procedure and subsequently stored in the content manager 120 or database server 150. As depicted, FIG. 3 shows an exemplary embodiment of an end of retention policy graphical user interface (GUI) for managing content that has reached an expiration date in the content manager 120. The area shown in 305 (FIG. 3) depicts the portion of the GUI screen where the options to enable a system-managed retention policy may be set and customized. As shown, the expiration date for the document is set for sixty days. To specify a default action, e.g., the deletion of the document after its expiration, the radio button 306 (FIG. 3) is selected. At 210, the CM administrator may create an execution schedule to automatically schedule the delete task (i.e., autodelete) by the database scheduler. By selecting the button 307 (FIG. 3), the CM administrator may customize the execution schedule for the automated retention policy, for example, Policy 1.

At 215, the CM administrator may complete the association between an item type (i.e., a document) and the retention policy created at 205 and customized at 210. For example, the CM administrator may select an item type and associate it with Policy 1, selected from the available retention policies. Thereafter, at 220 the associated retention policy for the delete task is automatically activated at the next day and time specified in the retention policy.

In another embodiment, a stored procedure may be created and managed by the database scheduler to generally manage documents within the content manager 120, or similar information management systems, such as for example, transitioning a document from one phase of a document's life cycle to another, or altering metadata for content.

Figure 4:
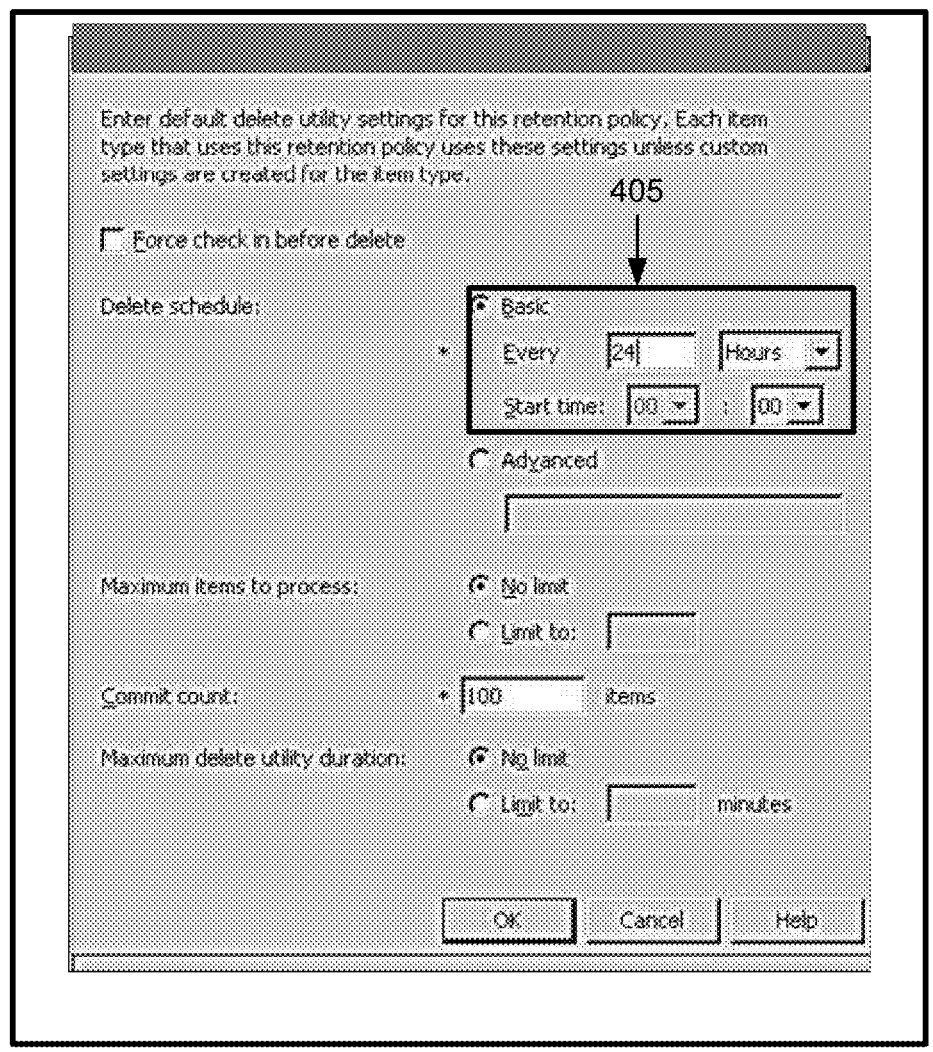
FIG. 4 is a screen depicting default utility settings for an exemplary retention policy.

The basic customizable options may be illustrated in the GUI 400 depicted in FIG. 4. In particular, the options shown in 405 indicate that the retention policy should be dispatched by the database's scheduler every day at midnight. The first execution of the retention policy, indicated by the start time, is the first midnight following the retention policy's creation. Based on the CM administrator's input on the UI of the end-user client 105 workstation, for example a GUI or command line, the modules of the CM system 100 communicate with the CM manager 120 and database server 150 to create a retention policy and embody the retention policy in a stored procedure. The retention policy may be stored in files or tables in the content manager 120, or within one or more tables in a database of the database server 150. The stored procedure may be stored in the database server 150, typically in a catalog structure that may be referred to as a data dictionary or metadata repository. Table 1 depicts an exemplary stored procedure to automatically delete expired documents.

TABLE 1

Example Retention Policy Stored Procedure Code

```
CALL SYSPROC.ADMIN_TASK_ADD
    ('AUTODELETE EVERY DAY',  -- name of the stored procedure
     NULL,                     -- begin timestamp
     NULL,                     -- end timestamp, unlimited
     NULL,                     -- unlimited runs
     '0 0 * * *',              -- every day at midnight (uses
                                  cron format)
     'PROD',                   -- schema of procedure task
                                  (SYSPROC)
     'AUTODELETE_SP',          -- name of procedure to run
     NULL,                     -- input to the procedure
     NULL,                     -- procedure options
     NULL)                     -- remarks
```

The disclosed implementation is not limited to a CM system 100 (FIG. 1) with a database server 150 (FIG. 1). Any information management system having an administrative interface (i.e., administrative workstation) for creating and storing control information in a DBMS, such as the database server 150 (FIG. 1) may be evaluated as an embodiment. For example, a Geographical Information System (GIS) may comprise an administrative workstation for entering and manipulating geographic information, such as map layers. The DBMS may manage the map data, shapes, locations, and layers in one or more tables. An end-user (or GIS administrator) may use tools or APIs on the administrative workstation to manipulate the geographic information stored in the DBMS to produce a variety of maps. The end-user input may be translated by the tools or APIs into one or more stored procedures, which may then be stored in the DBMS for subsequent dispatching by the DBMS scheduler.

In current practice, an administrator of a system that combines a plurality of technologies, such as a CM manager 120 in combination with a database server 150, may automate the execution of stored procedures using an operating system scheduler, such as for example, cron in UNIX. The operating system scheduler typically connects to the database containing the stored procedure, and performs the actions, such as determining which documents meet the selection criteria, e.g., expired, and performing the indicated operation, e.g., delete. However, since a scheduled job, such as the stored procedure, executes under the management of the operating system scheduler rather than the database scheduler, the scheduled job may incur disadvantages as a result. For example, the services or daemons that execute the scheduled job require access to the security credentials (i.e., userid and password) of the database or CM administrator. In an operating system scheduler environment, in order for these security credentials to be accessible they are stored outside of the database. This may result in security exposure because an administrative user's privileges and authorities usually extend beyond those of other users in the system. Additionally, the operating system scheduler may provide a less robust form of encryption, for example single key encryption, as compared to that provided by the database scheduler when accessing security credentials. However, the database scheduler executes scheduled jobs (i.e., stored procedures) using the security credentials of the user that created the stored procedure.

Figure 5:
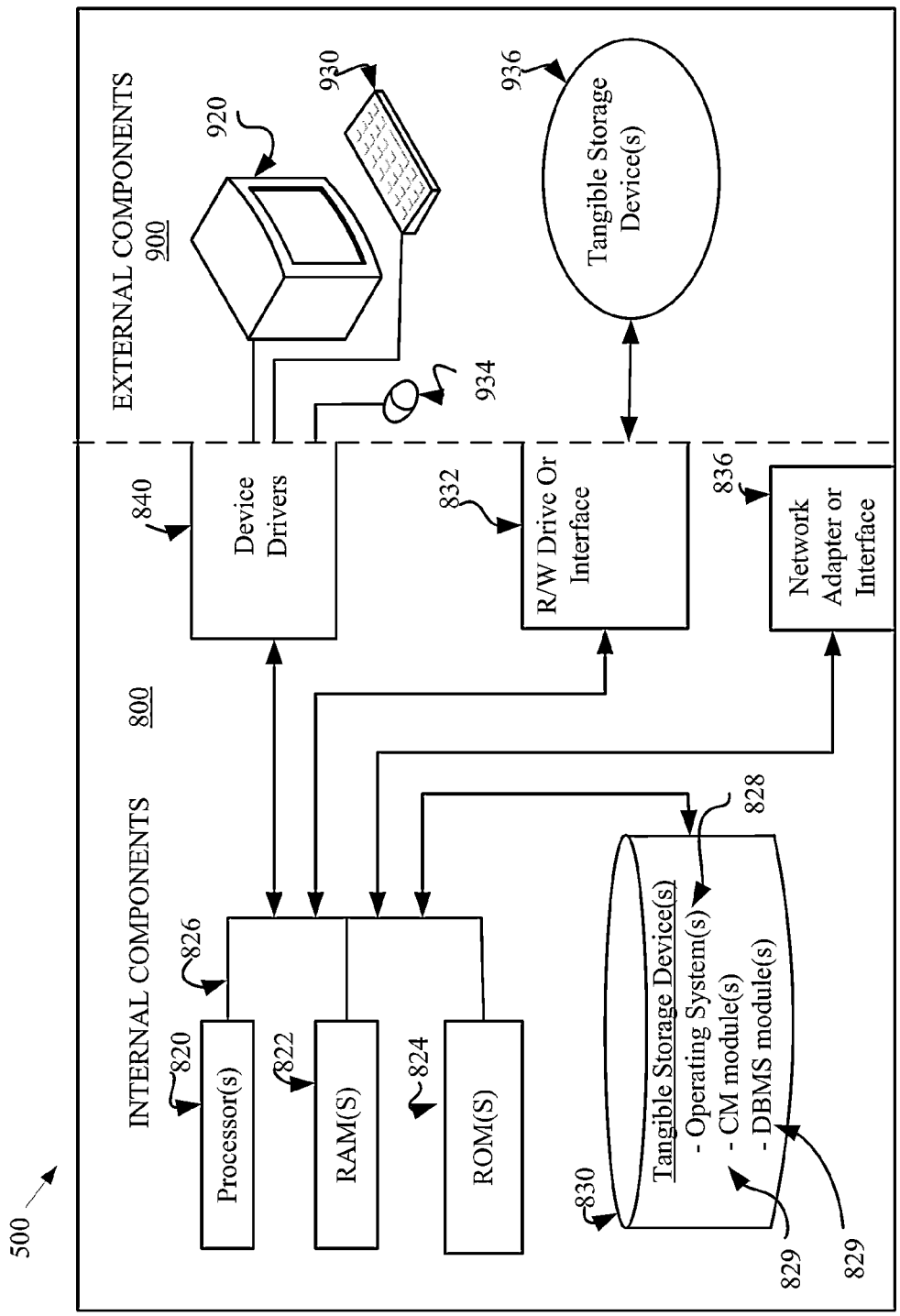
FIG. 5 is a schematic block diagram of hardware and software of the computer environment according to an embodiment of the method of FIG. 2.

In another possible concern, stored procedure jobs scheduled within an operating system share and compete with other non-database jobs for dispatching priorities and resources. This also implies that if an operating system error prevents the scheduled job from executing, the scheduled job will not be dispatched. Within the database, however, the database scheduler may restart failed stored procedure jobs, or may detect if the operating system was unavailable when the stored procedure job should have been dispatched and correctively dispatch it when the operating system becomes available. Further, the database scheduler may be queried to show the status of scheduled stored procedures, to manipulate the scheduled list, or to alter the schedule, using either SQL language or a GUI or UI similar to that shown in FIGS. 3-4. For instance, an exemplary SQL language query to alter a schedule for a stored procedure may be similar to the following:

ADMIN_TASK_UPDATE-('AUTODELETE EVERY HOUR', NULL, NULL, NULL, <new schedule info>, NULL, NULL);

Referring now to FIG. 5, computing device 500 may include respective sets of internal components 800 and external components 900 that together may provide an environment for a software application, such as a CM or a DBMS. Each of the sets of internal components 800 includes one or more processors 820; one or more computer-readable RAMs 822; one or more computer-readable ROMs 824 on one or more buses 826; one or more operating systems 828; one or more software applications (e.g., CM and DBMS modules 829) executing the method 200; and one or more computer-readable tangible storage devices 830. The one or more operating systems 828 and SAM modules 829 are stored on one or more of the respective computer-readable tangible storage devices 830 for execution by one or more of the respective processors 820 via one or more of the respective RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more computer-readable tangible storage devices 936 such as a CD-ROM, DVD, SSD, memory stick, magnetic tape, magnetic disk, optical disk or semiconductor storage device.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The CM modules and DBMS modules 829, and operating system 828 that are associated with computing device 500, can be downloaded to computing device 500 from an external computer (e.g., server) via a network (for example, the Internet, a local area network, or other wide area network) and respective network adapters or interfaces 836. From the network adapters (or switch port adapters) or interfaces 836 and operating system 828 associated with computing device 500 are loaded into the respective hard drive 830 and network adapter 836. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in FIGS. 1-5 illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A program product of end of retention processing using a database manager scheduler comprising:
   a computer readable storage medium readable by a processing circuit and storing instructions for execution by the processing circuit for performing a method comprising:
   receiving, by an application programming interface (API) of a content manager, a plurality of data retention parameters, and a plurality of execution schedule parameters, wherein program instructions received by the API cause the content manager to create a computer-executable retention policy based on the received data retention parameters, wherein the created retention policy includes program instructions to perform a deletion action upon expiration of the retention policy, and to store the computer-executable retention policy in a data dictionary of the content manager along with other existing computer-executable retention policies;
   receiving, by an application programming interface (API) of a content manager, program instructions to cause the content manager to create a computer-executable execution schedule based on the received plurality of execution schedule parameters, wherein the created execution schedule is to configure automatically executing the retention policy and associated deletion action;
   receiving an indication, by the API, to associate the computer-executable retention policy with one or more content types from a plurality of existing content types defined in the content manager and the execution schedule, wherein content types comprise metadata comprising at least content creation date and a business function association;
   updating a plurality of metadata describing the existing content types defined in the content manager to include the associated computer-executable retention policy, wherein the computer-executable retention policy is executed as a stored process and further comprises:
   a begin timestamp to begin dispatching, an end timestamp to end dispatching;
   an optional indication of a number of times to dispatch;
   a name of a database schema, wherein the database schema indicates a scope of operation for execution of the computer-executable retention policy;
   a plurality of inputs and options to the computer-executable retention policy; and a name representing a plurality of program instructions, dispatchable by the database manager scheduler and executable by the database manager; and
   based on a date/time parameter and a frequency parameter in the plurality of data retention parameters, executing, by the database manager scheduler, the computer-executable retention policy, wherein the database manager scheduler dispatches the computer-executable retention policy under security credentials of the creator of the computer-executable retention policy; and
   executing the execution schedule associated with the retention policy, wherein the executed execution activates the retention policy and associated deletion action.

2. The computer program product of claim 1, wherein in response to an expiration of the retention period being recognized during an execution of the computer-executable retention policy, performing, by the content manager, an action, wherein the action includes:
   creating;
   copying;
   modifying;
   archiving;
   versioning;
   publishing; and
   deleting.

3. The computer program product of claim 1, further comprising
   creating, by the content manager, the computer-executable retention policy, executable by the database manager scheduler, wherein the computer-executable retention policy includes:
   a begin timestamp to begin dispatching, an end timestamp to end dispatching;
   an optional indication of a number of times to dispatch;
   a name of a database schema, wherein the database schema indicates a scope of operation for execution of the computer-executable retention policy;
   a plurality of inputs and options to the computer-executable retention policy; and
   a name representing a plurality of program instructions, dispatchable by the database manager scheduler and executable by the database manager.

4. The computer program product of claim 3, wherein a schedule for executing the computer-executable retention policy comprises at least one of:
   a year;
   a month;
   a week;
   a day;
   an hour; and
   a minute.

5. The computer program product of claim 1, further comprising:
   receiving by a graphical user interface or a command line of the content manager, into the program instructions of the API, an indication to associate one of a plurality of existing computer-executable retention policies with one or more content types from a plurality of existing content types defined in the content manager.

6. A computer system for end of retention processing using a database manager scheduler, comprising one or more processors, one or more computer-readable storage devices, and a plurality of program instructions stored on at least one of the one or more storage devices for execution by at least one of the one or more processors, the plurality of program instructions comprising:
   receiving, by an application programming interface (API) of a content manager, a plurality of data retention parameters, and a plurality of execution schedule parameters, wherein program instructions received by the API cause the content manager to create a computer-executable retention policy based on the received data retention parameters, wherein the created retention policy includes program instructions to perform a deletion action upon expiration of the retention policy, and to store the computer-executable retention policy in a data dictionary of the content manager along with other existing computer-executable retention policies;

receiving, by an application programming interface (API) of a content manager program instructions to cause the content manager to create a computer-executable execution schedule based on the received plurality of execution schedule parameters, wherein the created execution schedule is to configure automatically executing the retention policy and associated deletion action;

receiving an indication, by the API, to associate the computer-executable retention policy with one or more content types from a plurality of existing content types defined in the content manager and the execution schedule, wherein content types comprise metadata comprising at least content creation date and a business function association;

updating a plurality of metadata describing the existing content types defined in the content manager to include the associated computer-executable retention policy, wherein the computer-executable retention policy is executed as a stored process and further comprises:

a begin timestamp to begin dispatching, an end timestamp to end dispatching; an optional indication of a number of times to dispatch;

a name of a database schema, wherein the database schema indicates a scope of operation for execution of the computer-executable retention policy;

a plurality of inputs and options to the computer-executable retention policy; and a name representing a plurality of program instructions, dispatchable by the database manager scheduler and executable by the database manager; and based on a date/time parameter and a frequency parameter in the plurality of data retention parameters, executing, by the database manager scheduler, the computer-executable retention policy, wherein the database manager scheduler dispatches the computer-executable retention policy under security credentials of the creator of the computer-executable retention policy; and executing the execution schedule associated with the retention policy, wherein the executed execution schedule activates the retention policy and associated deletion action.

7. The computer system of claim 6, wherein a schedule for executing the computer-executable retention policy comprises at least one of:
   a year;
   a month;
   a week;
   a day;
   an hour; and
   a minute.

8. The computer system of claim 6, wherein the one or more content types include:
   a text document;
   a photo;
   an e-mail;
   a sound recording; and
   video;
   wherein the one or more content types are stored in a plurality of files in a plurality of fileservers and a plurality of tables in a plurality of databases in a database server, and wherein the one or more content types are organized as metadata.

9. The computer system of claim 6, wherein in response to an expiration of the retention period policy further comprises: being recognized during an execution of the computer-executable retention policy, performing, by the content manager, an action, wherein the action includes:
   creating;
   copying;
   modifying;
   archiving;
   versioning;
   publishing; and
   deleting.

10. The computer system of claim 9, further comprising:
    receiving by a graphical user interface (GUI) or a command line of the content manager, into the program instructions of the API, an indication to associate one of a plurality of existing computer-executable retention policies with one or more content types from a plurality of existing content types defined in the content manager.

* * * * *